United States Patent
Maggi et al.

(10) Patent No.: US 12,170,963 B1
(45) Date of Patent: Dec. 17, 2024

(54) REDUCING ENERGY CONSUMPTION OF A BASE STATION CLUSTER OVER A FIXED TIME WINDOW

(71) Applicant: Nokia Solutions and Networks Oy, Espoo (FI)

(72) Inventors: Lorenzo Maggi, Massy (FR); Christophe Grangeat, Massy (FR)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/653,603

(22) Filed: May 2, 2024

(30) Foreign Application Priority Data

May 19, 2023 (EP) ..................................... 23174282

(51) Int. Cl.
*H04W 52/14* (2009.01)
*H04W 52/02* (2009.01)

(52) U.S. Cl.
CPC ..... *H04W 52/143* (2013.01); *H04W 52/0203* (2013.01)

(58) Field of Classification Search
CPC .......................... H04W 52/143; H04W 52/0203
See application file for complete search history.

(56) References Cited

U.S. PATENT DOCUMENTS

| | | |
|---|---|---|
| 2016/0309428 A1 | 10/2016 | Shin et al. |
| 2019/0082442 A1 | 3/2019 | Jin et al. |
| 2023/0239784 A1* | 7/2023 | Zhang ............... H04W 52/0206 370/318 |
| 2023/0276375 A1 | 8/2023 | Maggi et al. |

FOREIGN PATENT DOCUMENTS

| | | | |
|---|---|---|---|
| CN | 110475318 A | 11/2019 | |
| CN | 111343704 A | 6/2020 | |
| CN | 113543284 A | 10/2021 | |
| EP | 2919531 A1 * | 9/2015 | ........ H04W 52/0206 |
| WO | WO-2022257670 A1 * | 12/2022 | |

OTHER PUBLICATIONS

"Climate Action Handbook", GSMA, Oct. 2019, 24 pages.

(Continued)

*Primary Examiner* — Farid Seyedvosoghi
(74) *Attorney, Agent, or Firm* — Nokia Solutions and Networks Oy

(57) ABSTRACT

An apparatus comprising circuitry configured to: determine at least one parameter used to determine an energy cap for a time period for at least one network node within a cluster of at least one network node comprising the at least one network node; determine the energy cap for the time period for the at least one network node within the cluster, based on the at least one parameter; wherein the energy cap for the time period for the at least one network node is determined so that energy consumed by the cluster during a time window comprising multiple time periods does not exceed an energy constraint, the multiple time periods comprising the time period; and transmit the energy cap for the time period to the at least one network node within the cluster at a beginning of the time period.

11 Claims, 8 Drawing Sheets

(56) References Cited

OTHER PUBLICATIONS

"5G-era Mobile Network Cost Evolution", GSMA, Retrieved on Apr. 29, 2024, Webpage available at : https://www.gsma.com/futurenetworks/wiki/5g-era-mobile-network-cost-evolution/.

"Europe braces for mobile network blackouts", Euractiv, Retrieved on Apr. 29, 2024, Webpage available at : https://www.euractiv.com/section/global-europe/news/europe-braces-for-mobile-network-blackouts/.

Zhang et al., "Energy-efficient base station control with dynamic clustering in cellular network", 8th International ICST Conference on Communications and Networking in China (CHINACOM), Aug. 2013, 5 pages.

Extended European Search Report received for corresponding European Patent Application No. 23174282.6, dated Nov. 16, 2023, 5 pages.

"Mandated service restriction orders (network shutdowns)", Mobile Policy Handbook, GSMA, Feb. 23, 2024, pp. 78-79.

Extended European Search Report received for corresponding European Patent Application No. 23174282.6, dated Nov. 16, 2023, 35 pages.

\* cited by examiner

REDUCING ENERGY CONSUMPTION OF A BASE STATION CLUSTER OVER A FIXED TIME WINDOW

RELATED APPLICATION

This application claims benefit of priority from European Patent App. No. 23174282.6, filed May 19, 2023, the disclosure of which is hereby incorporated in its entirety by reference herein.

TECHNICAL FIELD

The examples and non-limiting example embodiments relate generally to communications and, more particularly, to reducing energy consumption of a base station.

BACKGROUND

Managing power consumption in a communication network, such as a wireless communication network, may be necessary for business and other reasons.

SUMMARY

In accordance with an aspect, an apparatus includes at least one processor; and at least one memory storing instructions that, when executed by the at least one processor, cause the apparatus at least to: determine at least one parameter used to determine an energy cap for a time period for at least one network node within a cluster of at least one network node comprising the at least one network node; determine the energy cap for the time period for the at least one network node within the cluster, based on the at least one parameter; wherein the energy cap for the time period for the at least one network node is determined so that energy consumed by the cluster during a time window comprising multiple time periods does not exceed an energy constraint, the multiple time periods comprising the time period; and transmit the energy cap for the time period to the at least one network node within the cluster at a beginning of the time period.

In accordance with an aspect, an apparatus includes at least one processor; and at least one memory storing instructions that, when executed by the at least one processor, cause the apparatus at least to: receive, from a computing node, an energy cap for a time period at a beginning of a time period, wherein the apparatus comprises a network node within a cluster of at least one network node; consume an amount of energy during the time period such that the amount of consumed energy during the time period does not exceed the energy cap for the time period; and transmit, to the computing node, the amount of energy consumed during the time period.

BRIEF DESCRIPTION OF THE DRAWINGS

The foregoing aspects and other features are explained in the following description, taken in connection with the accompanying drawings.

DETAILED DESCRIPTION

Figure 1:
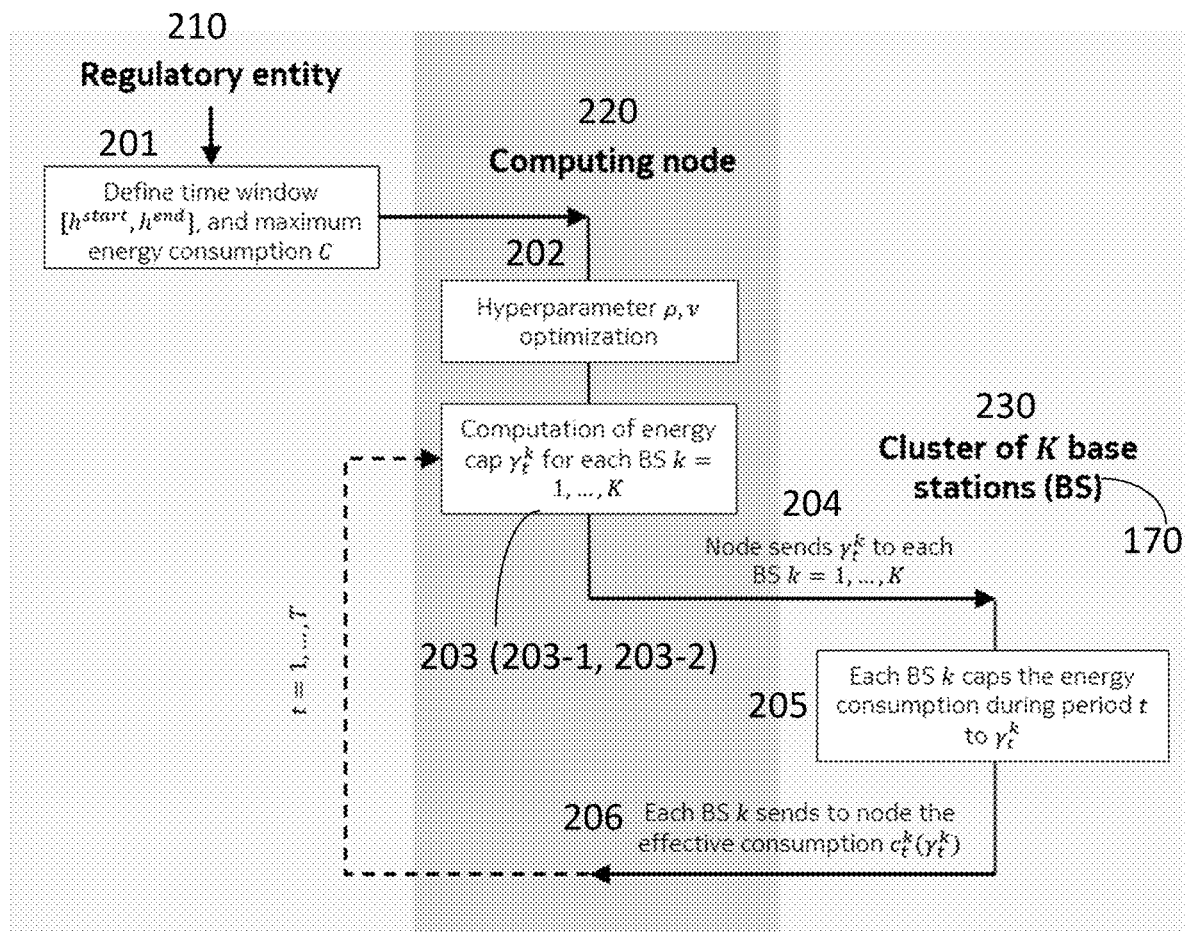
FIG. 1 is a diagram of a method for reducing energy consumption of a base station cluster over a predefined time period.

The examples described herein are for use within a wireless communication network having a computing node 220 and a cluster 230 of base stations, based on a time window configured by the network operator based on requirements from a regulatory entity or another source 210 (refer to FIG. 1) to fairly distribute energy consumed by the cluster 230 during that time window.

Energy is a scarce resource. Environmental regulations agencies around the globe are encouraging a more conservative use of energy in an effort to reduce carbon emissions. Energy regulatory agencies and powerline companies are also confronted to managing the availability of the grid power delivery in situation of energy resources limitations.

Accordingly, operators may desire to reduce the energy consumption of their network in the long term, such as by improving the design of the hardware and infrastructure. The operators may further operate the hardware and software components of the network equipment over a predefined time window (or time period) to smooth energy consumption during peak-hour traffic and avoid energy shortage in order to maintain a certain level of service, e.g., for emergency services.

Described herein is a method for ensuring that the total energy consumption over a predefined time period does not exceed a predefined amount of energy (e.g., does not exceed a predefined consumption limit or energy consumption budget C) while smoothing energy consumption across the time window, such that energy consumption of a cluster of base stations during the time window stays relatively constant with relatively low deviation and minimizing the impact on the flow of data traffic.

In one example, the energy consumption of a cluster of K base stations can be controlled and may be set to not exceed a predefined energy consumption budget C Joules (J) over a predetermined time window $[h^{start}, h^{end}]$ (for instance, $h^{start}$=4 PM and $h^{end}$=8 PM on a specific day). Additionally or alternatively, the energy consumption policy may aim to smooth (e.g., equalize, stabilize, even out or otherwise control) energy consumption of the cluster of K base stations during peak hours and/or to avoid, prevent, or minimize a possibility of a power outage. In one example, the time window [0, W] is discretized over a time grid $[w_0 := h^{start}, w_1, w_2, \ldots, w_{T-1}, w_T := h^{end}]$, where the index $t=1, \ldots, T$ refers to the t-th time period $[w_{t-1}, w_t]$.

Described herein is a method to redistribute the energy consumption budget C across time periods by capping the energy consumption in each time period t and to each base station k to a value $\gamma_t^k \geq 0$.

Accordingly, during a time period t, the energy consumed by the base stations k=1, ..., K is capped to a value $\gamma_t^k \geq 0$. In one example, the energy consumption system and one or more of the base stations may be configured to reduce the input antenna power such that the energy consumed by the base stations k=1, ..., K is capped to a value $\gamma_t^k \geq 0$. As another example, the energy consumption system and one or more of the base stations in accordance with the present disclosure may be configured to reduce the number of allocated physical resource blocks (PRBs), such that the energy consumed by the base stations k=1, ..., K is capped to a value $\gamma_t^k \geq 0$. As still another example, the energy consumption system and one or more of the base stations in accordance with the present disclosure may be configured to reduce the number of active frequency layers and/or a number of power amplifiers that are active such that the energy consumed by the base stations k=1, ..., K is capped to a value $\gamma_t^k \geq 0$. As yet another example, the energy consumption system and one or more of the base stations of the present disclosure may be configured to reduce the number of active transmit paths and/or a number of antennas that are active such that the energy consumed by the base stations k=1, ..., K is capped to a value $\gamma_t^k \geq 0$. Of course, one or ordinary skill in the art would understand that capping energy consumption of the base stations using some combination of these and/or other example approaches is also contemplated.

The method described herein may be executed by one or more processors or another hardware component, software component, or some combination thereof. As described herein, the method is independent of the specific method used to reduce energy consumption, and any of the options listed herein can be employed. The actual energy consumption (e.g., measured energy consumption) of base station k in time period t, denoted as $c_t^k(\gamma_t^k)$, does not exceed the predefined energy cap $\gamma_t^k$, and may be less than $\gamma_t^k$ if the energy demand is lower, i.e., $c_t^k(\gamma_t^k) \leq \gamma_t^k$.

To reduce energy consumption of a cluster of base stations, the energy consumption optimization system of the present disclosure is configured to define the energy cap $\gamma_t$ and the energy consumption $c_t(\gamma_t)$ of the cluster, such that $$\gamma_t = \sum_{k=1}^{K} \gamma_t^k, \forall t = 1, \ldots, T \tag{1}$$

$$c_t(\gamma_t) = \sum_{k=1}^{K} c_t^k(\gamma_t^k), \forall t = 1, \ldots, T \tag{2}$$

In other words, Equation (1) provides that, for each time period t, the energy cap for the cluster ($\gamma_t$) is a sum of the energy caps of the base stations (each denoted as $\gamma_t^k$) within the cluster, and Equation (2) provides that, for each time period t, the energy consumption of the cluster ($c_t(\gamma_t)$) is a sum of the energy consumption quantities of each of the base stations (each denoted as $c_t^k(\gamma_t^k)$). Because $c_t^k(\gamma_t^k) \leq \gamma_t^k$, it also holds that $c_t(\gamma_t) \leq \gamma_t$.

The notation used to denote the energy consumption of a base station for a time period ($c_t^k(\gamma_t^k)$) and the energy consumption of the cluster for a time period ($c_t(\gamma_t)$) is chosen because the energy consumption of a base station for the time period $c_t^k(.)$ may be a function of the base station cap for the time period ($\gamma_t^k$), and the energy consumption of the cluster for the time period $c_t(.)$ may be a function of the cluster cap for the time period ($\gamma_t$).

The energy consumption optimization system of the present disclosure is configured to ensure that the energy consumed by the cluster of base stations does not exceed the energy consumption limit C while minimizing the impact on the network traffic. More specifically, the energy consumption optimization system of the present disclosure is configured to ensure that the energy consumption distribution over time is fair according to a predefined fairness metric. Further, the energy consumption optimization system is configured to avoid setting the energy cap $\gamma$ to a value less than a threshold amount of energy for a time period greater than a threshold amount of time to avoid or minimize a possibility that any one of the base stations does not having enough power for operation.

As one example, the energy consumption optimization system is configured to solve a problem in accordance to the below problem formulation (referred to for convenience as Equation (3)), such that:

$$\max_{\gamma} \mathbb{E}\left[ f\left(\{c_t^k(\gamma_t^k)\}_{t=1,\ldots,T, k=1,\ldots,K}\right)\right] \tag{3}$$

$$\text{such that } \sum_{t=1}^{T} c_t(\gamma_t) \leq C,$$

where $f(.)$ is a fairness function of the energy consumption values, where the fairness function $f(.)$ is defined such that a value of the energy cap $\gamma$ is chosen to maximize expectation ($\mathbb{E}$) of the fairness function $f(.)$ with respect to the uncertainty of the future data traffic, while keeping the energy consumption of the cluster over the time periods $$\left(\sum_{t=1}^{T} c_t(\gamma_t)\right)$$

less than or equal to the predefined energy consumption budget C.

For instance, a function $f(\{\gamma_i\}_i) = \sum_x a_x \text{perc}_x(\{y_i\}_i)$ is a linear combination of the x-th percentile (i.e., $\text{perc}_x$) of the values $\{y_i\}_i$, where the weights $a_x$ are concave increasing with respect to x. The fairness function may be defined according to Equation (4), such that $$f(\{y_i\}_i) = \begin{cases} \sum_i \dfrac{y_i^{1-\alpha}}{1-\alpha} \text{ for } \alpha \geq 0, \alpha \neq 1 \\ \sum_i \log(y_i) \text{ for } \alpha = 1 \end{cases} \tag{4}$$

The fairness function $f(\{y_i\}_i)$, also referred to as an alpha-fairness function, prioritizes (i.e., gives higher weight to) low values of the distribution of values of y, and approaches the max-min solution as a approaches infinity, where $\alpha$ is a parameter having a value chosen to control the shape of the output of the fairness function $f$.

Fairness functions as defined and provided for use in the problem formulation in at least Equations (3) and (4) provide more weight to low values of the distribution to reduce the occurrences of energy consumption values that are less than predefined threshold. Fairness functions as defined in at least Equations (3) and (4) also work to increase the occurrence of high energy consumption values (i.e., energy consumption values that are greater than a predefined threshold).

An approach to addressing the problem defined above is to maintain the effective isotropic radiated power (EIRP) below a certain limit over a fixed time window. The EIRP is positively correlated with the transmitted power, so limiting the EIRP also helps limiting the consumed energy. However, this approach does not attempt to reduce the impact on the data traffic. Accordingly, the EIRP, and thereby the energy consumption, may be forced to a very low value (up to −6 dB lower than the nominal value) during several hours.

Another approach includes maintaining the EIRP below a predefined limit over a fixed time window, and attempting to minimize the occurrences of low EIRP values. However, this approach relies on an assumption that the EIRP (or, transposing to the context as described herein, the energy consumption) is predictable over the next (subsequent) decision steps. This choice is motivated by defining the time window [0, W] as being 24 hours of the day, during which a busy/non-busy pattern is visible. The approach also assumes that the EIRP (or, transposing to the context as described herein, the energy consumption) at subsequent steps is unaffected by the current control because the decision period has a long duration (e.g., several hours). Yet, over a shorter time period (e.g., a time period from several seconds to several minutes), reducing energy consumption at a given time increases the energy demand at subsequent times, since unserved data traffic is buffered at the base station.

There are features allowing for energy savings via cell switch-off whenever the average load in a power saving group (PSG) (being generally a subset of layers within a sector) is less than a predefined threshold average load. More precisely, when the PRB utilization in a PSG drops below a pre-configured (lbpsMinLoad) load threshold, one cell is switched off using a graceful shutdown procedure. A cell is then switched back on (in an order specified by a cell switch order parameter when the PRB utilization at the PSG level grows above another pre-configured threshold (lbpsMaxLoad). There are also features for achieving energy savings by switching off half of the transmitter paths whenever the average base transceiver station traffic load is less than a predefined threshold traffic load, also referred to as multiple input multiple output (MIMO) muting. There are other features for ensuring that the EIRP averaged over a sliding window (e.g., of duration of 6 to 30 minutes) is lower than a certain limit.

In one example, the energy cap $\gamma_t$ may be set to correspond to the remaining energy consumption budget of the cluster, such that $$\gamma_t = C - \sum_{i=1}^{t-1} c_i(\gamma_i) \qquad (5)$$

and then to distribute the available energy cap $\gamma_t$ across different base stations in an arbitrary manner. However, the remaining energy consumption budget may be depleted at any time, which may cause the energy cap $\gamma$ and/or the energy consumption during all subsequent time periods to be reduced to zero. Such an energy distribution approach may not be ideal since insufficient energy allocation may cause certain telecommunication services to become unavailable.

Another example approach includes setting the energy cap $$\gamma_t = \frac{c}{T}$$

at each of time periods=1, . . . , T, such that a total energy consumption $$\sum_{t=1}^{T} c_t(\gamma_t)$$

does not exceed a predefined quantity C. However, this approach may be overly conservative and may cause energy consumption to be reduced unnecessary, thereby affecting the upper percentiles of the distribution of the energy consumption values.

FIG. 1 illustrates an example method for reducing energy consumption of a base station over a predefined period of time. The method may be executed by a computing node 220 in communication with a cluster of base stations (hereinafter, cluster) 230 and configured to retrieve energy consumption data therefrom. The computing node 220 is configured to issue an instruction or command comprising new values of the energy cap to cause the cluster of the base stations (such as one or more base stations 170 described in reference to at least FIG. 5) to operate according to the received new values of energy cap.

At step 201, the computing node 220 may be configured to receive, for example, from a regulatory entity 210 or from another source, a time window [$h^{start}$, $h^{end}$] during which the energy consumed by a cluster 230 of K base stations 170 cannot exceed an upper limit C. Thus C is an energy constraint.

At step 202, the computing node 220 selects and optimizes hyperparameters $\rho$, $\{v\}_{k=1}^{K}$ which define the energy control policy as defined in step 203. The selection of the hyperparameters includes setting hyperparameter $\rho$ to be between zero (0) and one (1), i.e., $\rho \in [0,1]$, and/or setting $v_k$ to be the average energy consumption of base station k during a predefined time window, e.g., during one or more previous days.

The cluster 230 of base stations 170 is generally established by the regulator 210, and within a geographical area where electricity is a scarce resource. The cluster identity can change over time. In that case, the computing node 220 just has to re-perform the optimization of p, v hyperparameters as in Step 202. The desired level of fairness can be configured by the operator in step 201. The computing node 220 can be implemented as a cognitive self-organizing network (CSON) node. As illustrated in FIG. 1, the data exchange relates to base stations 170 to CSON 220 effective consumption and CSON 220 to base station 170 power control or reduction ($\gamma_t$, $\gamma_t^k$).

At step 203, such as, for example, at a beginning of each period t=1, . . . , T, the computing node 220 is configured to at least one of compute the energy cap of the cluster 230 and compute the energy cap for each base station 170. In an example, as described below, the step 203 may include one or more of steps 203-1 and 203-2. For instance, at step 203-1, the computing node 220 computes the energy cap for the cluster 230 for time period t, as provided in Equation (6), such that $$\gamma_t^{(\rho)} = b_t - \rho C \frac{(T-t)}{T}, \qquad (6)$$

where $b_t$ is the remaining available energy budget, as provided in Equation (7), such that $$b_t = C - \sum_{i=1}^{t-1} c_i(\gamma_i) \quad (7)$$

As another example, at step 203-2, the computing node 220 computes the energy cap $\gamma_t^k$ for each base station k 170 in the cluster 230 for time period t, proportionally to weights v, such that:

$$\gamma_t^k = \frac{v_k}{\sum_j v_j} \gamma_t^{(\rho)}, \forall k = 1, \ldots, K. \quad (8)$$

Since $$\sum_{k=1}^{K} \gamma_c^k = \gamma_c^{(\rho)},$$

a value of the energy cap of the cluster 230 is shared across all base stations 170 of the cluster 230 (i.e., the computing node 220 is configured to distribute, split, or divide the energy cap among base stations 170 proportionally with respect to the corresponding weights v of those base stations 170). In this manner, the computing node 220 is configured to operate the cluster 230 according to the energy consumption constraint C based on the fairness function $f$ of the energy consumption distribution while ensuring a pre-defined minimum amount of energy consumption $\rho C/T$ is available to each base station 170 of the cluster 230 during each of the time periods.

At step 204, at the beginning of time period t, the computing node 220 sends, or causes to be sent, the energy cap value $\gamma_t^k$ to each base station k=1, . . . , K in the cluster.

At step 205, during period t, each base station k=1, . . . , K (e.g., each of the plurality K of base stations 170) implements an energy savings strategy which caps the energy consumption during period t to $\gamma_t^k$ (e.g., by reducing antenna power, number of subcarriers, number of frequency layers, number of transmit paths, or a combination of these and other methods. Additionally or alternatively, the computing node 220 that performs the computation steps 202, 203 may be configured to implement an energy savings strategy (e.g. by controlling the base stations) which caps the energy consumption during period t to $\gamma_t^k$ (e.g., by reducing antenna power, number of subcarriers, number of frequency layers, number of transmit paths, or a combination of the above).

At step 206, at the end of period t, base station k 170 determines a value of the energy actually consumed during a time period t (namely $c_t^k(\gamma_t^k)$) and sends the value of $c_t^k(\gamma_t^k)$ to the computing node 220.

The energy cap $\gamma_t^{(\rho)}$ computation as in steps 203-1 and 203-2 abides by Fact 1, such that $$\gamma_t^{(\rho)} = b_t - \rho C \frac{(T-t)}{T}, \forall t = 1, \ldots, T$$

is the highest value that the energy cap can take on at a time period t to ensure that the energy budget C is not exceeded while guaranteeing a minimum energy consumption of $\rho C/T$ at all subsequent time periods t+1, . . . , T, where $0 \leq \rho \leq 1$. In other words, the energy cap $\gamma_t^{(\rho)}$ is the highest value such that $$\gamma_i \geq \rho \frac{C}{T}, \forall i = t+1, \ldots, T \quad (9)$$

while ensuring $$\sum_{t=1}^{T} c_t(\gamma_t) \leq C.$$

Setting hyperparameter $\rho$ to be greater than one (1) (i.e., $\rho > 1$) leads to an unfeasible solution, where possibly $\gamma_t^{(\rho)} < 0$ which is meaningless.

Proof of Fact 1. Let $\gamma_t \geq \gamma_t^{(\rho)}$, where $\epsilon > 0$. Suppose that $$\gamma_i \geq \frac{\rho C}{T},$$

$\forall$ i=t+1, . . . , T. Then, suppose that requested energy consumption will exceed the cap $\gamma_i$. Hence, the effective consumption always equals the energy cap, i.e., $c_i(\gamma_i) = \gamma_i$, $\forall$ i=t+1, . . . , T. Then, the total energy consumption $$\sum_{i=1}^{T} c_i(\gamma_i) > C.$$

Therefore, if $\gamma_t > \gamma_t^{(\rho)}$ then there exist energy demand realizations such that the energy budget is exceeded.

On the other hand, let $\gamma_t \leq \gamma_t^{(\rho)}$. Then, if $\gamma_t^{(\rho)} \geq 0$ then there exists a feasible solution, where $$\gamma_i = \frac{\rho C}{T}$$

for all i=t+1, . . . , C. Indeed, in this case $$\sum_{i=1}^{T} c_i(\gamma_i) \leq C$$

for any realization of future energy demands. Thus, it remains to prove that $$\gamma_t^{(\rho)} = b_t - \rho C \frac{(T-t)}{T} \geq 0$$

for all t=1, . . . , T. This is true for t=1, since $$b_1 = C \geq \rho C \frac{(T-1)}{T}.$$

By induction, if $\gamma_t^{(\rho)} \geq 0$, then $$b_{t+1} = b_t - c_t \geq b_t - \gamma_t^{(\rho)} = \rho C \frac{(T-t)}{T} \geq \rho C \frac{(T-t-1)}{T}.$$

Therefore, $$\gamma_{t+1}^{(\rho)} = b_t - \rho C \frac{(T-t-1)}{T} \geq 0$$

as well. Thus, Fact 1 is proved by mathematical induction, wherein a base case shows that a given principle holds for a first value, an induction step shows that the same principle holds for a random value and for the value immediately after the random value, and must, therefore, hold for every value.

Accordingly, in step 203, by setting the energy cap $$\gamma_t^{(\rho)} \text{ to } \gamma_t^{(\rho)} = b_t - \rho C \frac{(T-t)}{T},$$

the total energy budget C is not exceeded and/or a minimum level of energy consumption (equal to $\rho C/T$ is guaranteed at all periods and/or the highest total consumption on the whole time window is achieved, such that an impact on data traffic is minimized.

Additionally or alternatively, in order to maximize the fairness of energy consumption distribution, as set out herein, the hyperparameters $\rho$, v are optimized at step 202. As described in reference to FIG. 1, the energy cap policy computed in step 203 depends on hyperparameters $\rho$, $\{v_k\}_k$ defined, for example, by the computing node 220, at step 202 and prior to the beginning $t^{start}$ of the time window. To optimize the hyperparameters $\rho$, v to maximize the fairness function of consumption values as described herein, the computing node 220 is configured to ensure, for v, fairness across base stations 170 in the cluster 230. In an example, fairness across base stations 170 of the cluster 230 includes causing the reducing, by the computing node 220, the percentage of energy consumption by a same amount for all base stations 170 of the cluster 230.

Accordingly, the computing node 220 retrieves historical data reporting the energy consumption of each base station 170 in the cluster 230. The computing node 220 sets coefficient $v_k$ to the average energy consumption of base station k during the same hours of the day as $[t^{start}, t^{end}]$ during one or more previous days of operation. In an example, if a base station k consumes 1000 Joules per second (J/s) between 8 AM and 8 PM on a previous day 1 and 500 J/s between 8 AM and 8 PM on a previous day 2, then the computing node 220 is configured to set coefficient $v_k$ to (1000)/s+500 J/s)/2, or set coefficient $v_k$=750 J/s. As just one example, the computing node 220 is configured to select a predefined number of previous days to compute coefficient $v_k$.

As described in reference to at least step 203-1, setting hyperparameter $\rho \in [0,1]$ allows the energy cap $\gamma$ to be at least $\rho C/T$ at all periods. Accordingly, the higher the hyperparameter $\rho$, the higher the energy consumption guarantee, and the lower the energy cap (being $$\gamma_t^{(\rho)} = b_t - \rho C \frac{(T-t)}{T},$$

hence decreasing as hyperparameter $\rho$ increases). As a result, the higher hyperparameter $\rho$ is, the more "squeezed" (i.e., demand values 306 and consumption values 308 are more concentrated towards $\rho C/T$) is the distribution of energy consumption towards the minimum level $\rho C/T$. More specifically, referring to FIG. 3, the distribution below $\rho C/T$ (310) is left untouched, while the distribution above $\rho C/T$ (320) is "attracted" towards $\rho C/T$ (see FIG. 2, FIG. 3). Such trade-off is expected, since the average of the distribution is lower than the C for all values of $\rho$.

Accordingly, different values of the hyperparameter $\rho$ correspond to different fairness levels of the energy consumption distribution, where the fairness translates a certain trade-off between the low and high part of the distribution.

Figure 2:
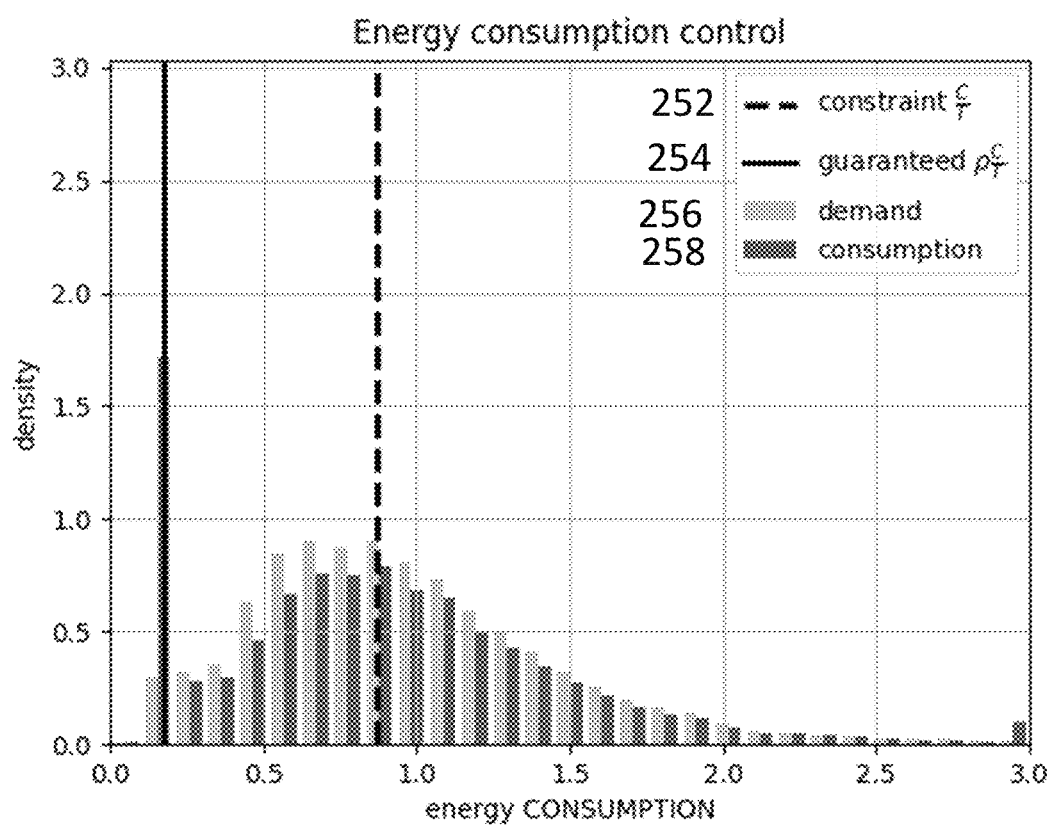
FIG. 2 illustrates a histogram for energy demand with respect to energy consumption for a predefined relatively low guaranteed level.

FIG. 2 illustrates a histogram of (normalized) energy demand (256) with respect to consumption (258) for a predefined low guaranteed level ($\rho$=0.2). Customer data was used to produce FIG. 2, which further shows constraint C/T (252) and a predefined minimum guaranteed energy level $\rho C/T$ (254).

Figure 3:
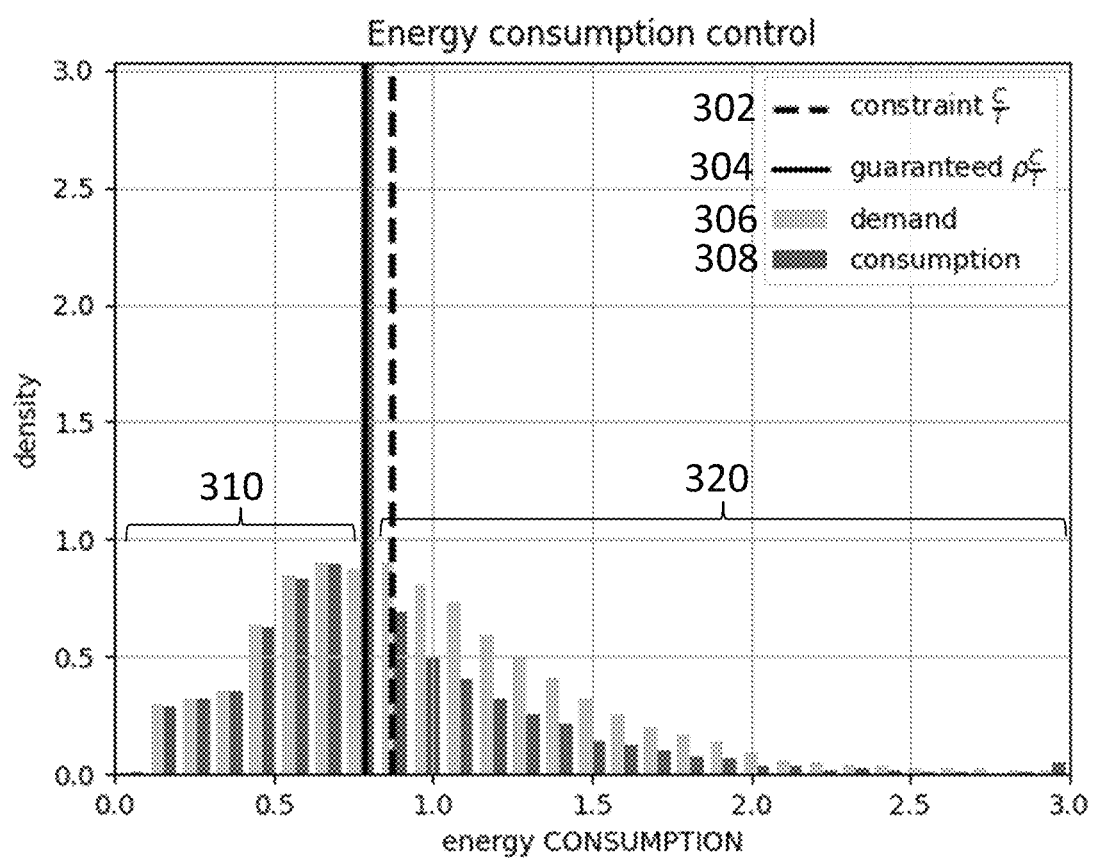
FIG. 3 illustrates a histogram for energy demand with respect to energy consumption for a predefined relatively high guaranteed level.

FIG. 3 illustrates a histogram of (normalized) energy demand (306) with respect to consumption (308) for a predefined high guaranteed level ($\rho$=0.9) on customer data. Note that the distribution below $\rho C/T$ (304) is left unchanged by the control, while the distribution above $\rho C/T$ is approaches value of guaranteed energy level $\rho C/T$. FIG. 3 further shows constraint C/T (302).

The value of hyperparameter $\rho$ may affect the shape of a distribution function of consumption values c, as well as, the fairness value of that consumption distribution. Then, to optimize hyperparameter $\rho$, the computing node 220 is configured to solve a problem (denoted below for convenience as Equation (10)) for the cluster 230 similar to the problem formulation denoted herein as Equation (3), where the energy control is set to $\gamma^{(\rho)}$, namely:

$$\max_{0 \leq \rho \leq 1} \mathbb{E}\left[f\left(\{c_t(\gamma_t^{(\rho)})\}_{t=1,\ldots,T}\right)\right] \quad (10)$$

$$\text{such that} \sum_{t=1}^{T} c_t(\gamma_t^{(\rho)}) \leq C$$

Meaning, the energy consumed by the cluster 230 does not exceed the predefined consumption limit C while minimizing the impact on the network traffic. The problem given by Equation (10) is to determine the value of the hyperparameter $\rho$ that maximizes the expectation ($\mathbb{E}$) of the fairness function $f(.)$ with respect to the uncertainty of the future data traffic. Solving the problem defined by Equation 10 results in a solution where the consumption distribution over time is fairly distributed according to a predefined fairness metric, where an example fairness metric is a "proportional fair" metric $f(\ )=\log(\ )$.

The computing node 220 is configured to solve Equation (10) using past data. In other words, the computing node 220 is configured to collect past energy consumption time series i) collected in the same cluster ii) during the same hours of the day as $[t^{start}, t^{end}]$ and iii) during which no energy control is applied, and estimate the effect of a certain energy control policy on them. Historical (effective) energy consumption values are considered as energy demands (denoted by d), while the effective consumption $c_t$ is computed as $$c_t = \min(d_t + u_t, \gamma_t^{(\rho)}), t=1, \ldots, T \quad (11)$$

where $u_t$ describes the unmet energy demand waiting to be served at period t. Modeling that illustrates that, when energy consumption is reduced in some periods, future energy demands typically increase and may include modeling hypothetical actual consumption in the presence of theoretical power control and may be performed using past data usage patterns.

The computing node 220 sets $u_1$=0 and updates u at each period t as provided in Equation (12):

$$t_{t+1} = (1-\beta)\max(d_t + u_t - c_t, 0), \quad (12)$$

where $d_t+u_t$ is indicative of a demand at time t (i.e., a sum of the new demand and the previously unmet demand, max $(d_t+u_t-c_t, 0)$ is indicative of the unmet demand at time t, and $\beta \in [0; 1]$ is a "dropping" factor, which determines the portion of energy waiting to be served being dropped at the new time period. In one example, a predefined value of $\beta$ may be stored local to, or remotely from, the energy consumption optimization system of the present disclosure and the computing node 220 may reference the stored value of $\beta$, as needed. Additionally or alternatively, the computing node 220 is configured to set $\beta=1$, meaning no energy demand is being postponed to the next period.

The same operation described above is repeated for different values of $\rho$ and the corresponding fairness value $f(\{c_t\}_{t=1,\ldots,T})$ of consumption time series is computed. Finally, the value of p maximizing the fairness is selected.

To optimize hyperparameter $\rho$, the computing node 220 is configured to receive as input one or more historical energy consumption values $\{d_t^i\}_{t=1,\ldots,T,\ i \in I}$ of the cluster 230, where i is the index of the day. All values are measured over the same hours of the day as $[t^{start}, t^{end}]$.

---

Procedure:
  For $\rho = 0, \ldots, 1$
    For $i \in I$
      Set $u_1 = 0, b_1 = C$
      For $t = 1, \ldots, T$ Compute energy cap $\gamma_t^{(\rho)} = b_t - \rho C \frac{(T-c)}{T}$ Compute the effective energy consumption in hindsight:
          $c_t = \min(d_t^i + u_t, \gamma_t^{(\rho)})$
        Update energy budget $b_{t+1} = b_t - c_t$
        Update unmet energy: $u_{t+1} = (1-\beta) \max(d_t^i + u_t - c_t, 0)$
      End For
      Compute fairness $f_i^{(\rho)} = f(\{c_t\}_{t=1,\ldots,T})$
    End For
    Compute average fairness $f^{(\rho)} = \Sigma_{i \in I} f_i^{(\rho)}$ associated to $\rho$
  End For Compute $\rho^* = \arg\max_\rho f^{(\rho)}$ Select $\rho^*$ as the hyperparameter for the upcoming period $[t^{start}, t^{end}]$.

---

Figure 4:
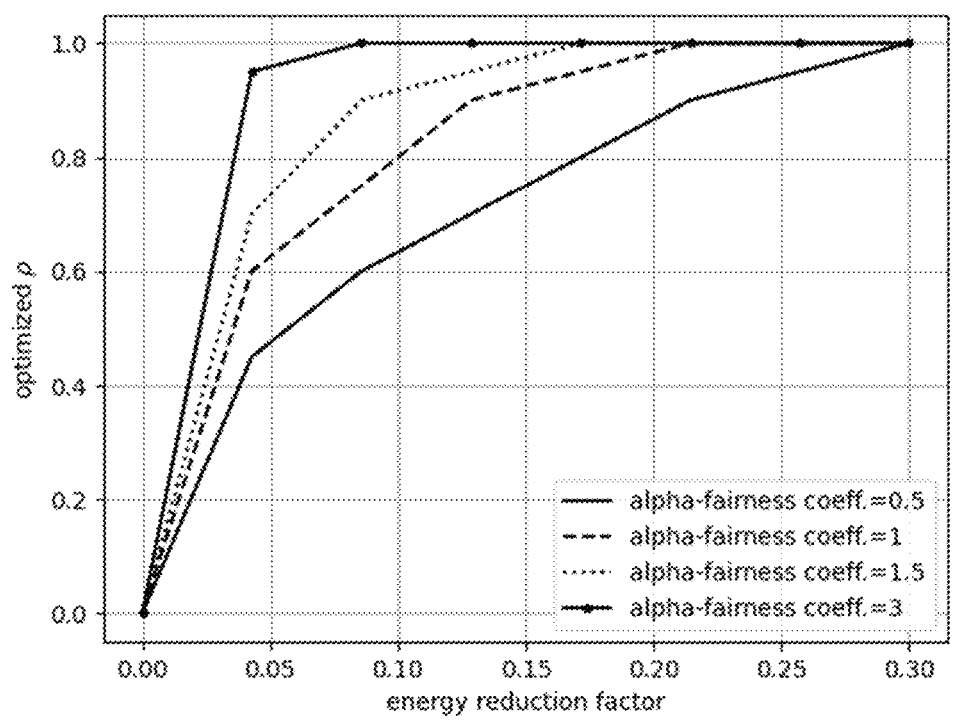
FIG. 4 illustrates values of hyperparameters optimized in accordance with the present disclosure.

FIG. 4 illustrates the results of step 202 optimization, for different values of alpha-fairness coefficients $\alpha$ and of the "energy reduction factor", computed as 1−C/(total energy demand in historical data). As illustrated in FIG. 4, as the reduction factor increases, the optimal hyperparameter $\rho$ also increases, since it maximizes the fairness of the energy consumption distribution. Also, as fairness coefficient $\alpha$ increases, the optimal value of hyperparameter $\rho$ approaches 1 more quickly, since $\rho=1$ is the max-min solution and alpha-fairness may approach a max-min solution (where the minimum energy consumption value in the period is maximized) as a approaches infinity. Thus, FIG. 4 illustrates values of hyperparameter $\rho$ optimized via the method described in reference to step 202. The "reduction factor" is computed as 1−C/(energy demand).

Overall, it has been shown that via the method described herein: i) the total energy budget C is not exceeded, ii) a minimum level of energy consumption (equal to $\rho C/T$) is guaranteed at all periods, iii) the energy consumption is fairly distributed over time, meaning that its low tail (low energy consumptions) is as thin as possible, while ensuring that the high tail (high energy demands) is not too impacted, iv) the highest total consumption is achieved on the whole window (under constraints i. and ii.), which amounts to a minimum impact on traffic.

The examples described herein are intended to impact radio units for mobile networks. Also, the proposed procedure for reducing energy consumption of a base station cluster can be integrated in cognitive self-organizing networks (CSONs) or an open radio access network (ORAN) radio access network intelligent controller (RIC), which would play the role of the computing node 220. When implementing the examples described herein, the energy consumption distribution of a cluster of base stations may be concentrated around a single value (compare FIG. 2 and FIG. 3) being the minimum guaranteed level.

Figure 5:
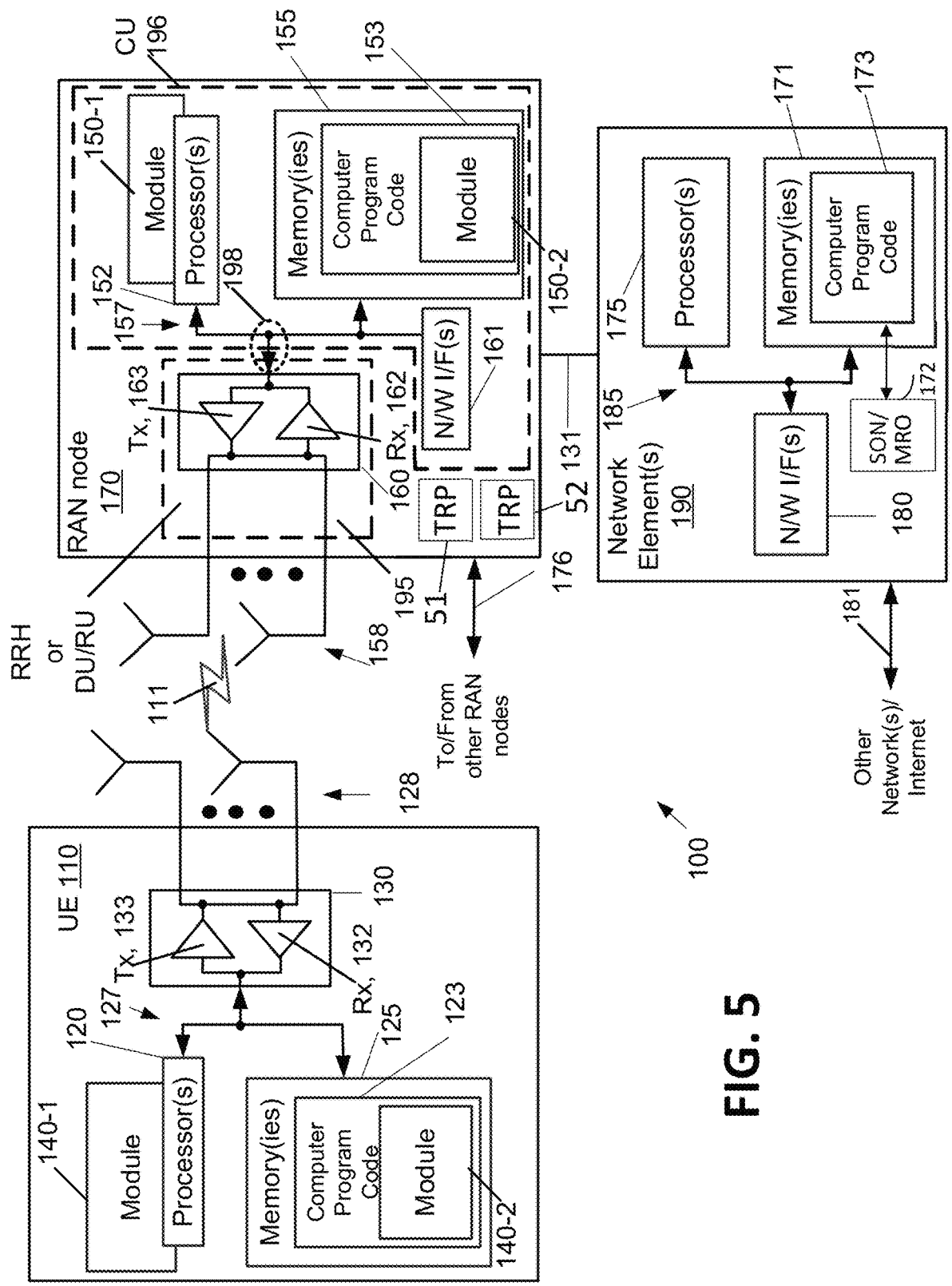
FIG. 5 is a block diagram of an example system in which the example embodiments may be practiced.

Turning to FIG. 5, this figure illustrates a block diagram of one possible and non-limiting example in which the examples may be practiced. A user equipment (UE) 110, radio access network (RAN) node 170, and network element(s) 190 are illustrated. In the example of FIG. 5, the UE 110 is in wireless communication with one or more devices communicatively coupled to a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver 132 and a transmitter 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the UE 110 to perform one or more of the operations as described herein. The UE 110 communicates with RAN node 170 via a wireless link 111.

The RAN node 170 in this example is a base station that provides access for wireless devices such as the UE 110 to the wireless network 100. The RAN node 170 may be, for example, a base station for fifth generation (5G), also called new radio (NR). In 5G, the RAN node 170 may be a new generation radio access network (NG-RAN) node, which is defined as either a gNB or a new generation evolved Node B (ng-eNB). A gNB is a base station for 5G NR, or a node providing NR user plane and control plane protocol terminations towards the UE, and connected via the new generation (NG, ng) interface (such as connection 131) to a 5G core network (5GC) such as, for example, the network element(s) 190. The gNB may act as a secondary node in EN-DC. The ng-eNB is a node providing E-UTRA user plane and control plane protocol terminations towards the UE, and connected via the NG interface (such as connection 131) to the 5GC. The NG-RAN node may include multiple gNBs, which may also include a central unit (CU) (gNB-CU) 196 and distributed unit(s) (DUs) (gNB-DUs), of which DU 195 is illustrated. Note that the DU 195 may include or be coupled to and control a radio unit (RU). The gNB-CU 196 is a logical node hosting radio resource control (RRC), service data adaptation protocol (SDAP) and packet data convergence protocol (PDCP) protocols of the gNB or RRC and PDCP protocols of the en-gNB (where en-gNB is a node providing NR user plane and control plane protocol terminations towards the UE, and acting as a secondary node in evolved universal terrestrial radio access (E-UTRA) network (E-UTRAN) new radio-dual connectivity (EN-DC)) that control the operation of one or more gNB-DUs. The gNB-CU 196 terminates the F1 interface connected with the gNB-DU 195. The F1 interface, which is an interface between the CU and DU, is illustrated as reference 198, although reference 198 also illustrates a link between remote elements of the RAN node 170 and centralized elements of the RAN node 170, such as between the gNB-CU 196 and the gNB-DU 195. The gNB-DU 195 is a logical node hosting radio link control (RLC), medium access control (MAC) and physical (PHY) layers of the gNB or en-gNB, and its operation is partly controlled by gNB-CU 196. One gNB-CU 196 supports one or multiple cells. One cell may be supported with one gNB-DU 195, or one cell may be supported/shared with multiple DUs under RAN sharing. The gNB-DU 195 terminates the F1 interface 198 connected with the gNB-CU 196. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution or fourth generation (4G)), or any other suitable base station or node.

The RAN node 170 includes one or more processors 152, one or more memories 155, one or more network (N/W) interfaces (I/F(s)) 161, and one or more transceivers 160 interconnected through one or more buses 157. Each of the one or more transceivers 160 includes a receiver 162 and a transmitter 163. The one or more transceivers 160 are connected to one or more antennas 158. The one or more memories 155 include computer program code 153. The CU 196 may include the processor(s) 152, one or more memories 155, and network interfaces 161. Note that, while not separately illustrated herein, the DU 195 may also contain its own memory/memories and processor(s), and/or other hardware.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the connections (or links) 176 and 131. Two or more gNBs 170 may communicate using, e.g., link 176. The link 176 may be wired or wireless or both and may implement, for example, an Xn interface for 5G, an X2 interface for LTE, or other suitable interface for other standards. The Xn interface is a network interface between NG-RAN nodes, and the X2 interface is between RAN nodes and between RAN and the core network.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU 195, and the one or more buses 157 could be implemented in part as, for example, fiber optic cable or other suitable network connection to connect the other elements (e.g., a central unit (CU), gNB-CU 196) of the RAN node 170 to the RRH/DU 195. Reference 198 also indicates those suitable network link(s).

A RAN node/gNB can comprise one or more transmission reception points (TRPs) to which the methods described herein may be applied. FIG. 5 shows that the RAN node 170 comprises two TRPs, TRP 51 and TRP 52. The RAN node 170 may host or comprise other TRPs not illustrated in FIG. 5.

A relay node in NR is called an integrated access and backhaul node. A mobile termination part of an integrated access and backhaul (IAB) node facilitates the backhaul (parent link) connection. In other words, the mobile termination part comprises the functionality which carries UE functionalities. The distributed unit part of the IAB node facilitates the so called access link (child link) connections (i.e. for access link UEs, and backhaul for other IAB nodes, in the case of multi-hop IAB). In other words, the distributed unit part is responsible for certain base station functionalities. The IAB scenario may follow the so called split architecture, where the central unit hosts the higher layer protocols to the UE and terminates the control plane and user plane interfaces to the 5G core network.

It is noted that the description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360-degree area so that the single base station's coverage area covers an approximate oval or circle. Furthermore, each cell can correspond to a single carrier and a base station may use multiple carriers. Thus, if there are three 120-degree cells per carrier and two carriers, then the base station has a total of six (6) cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include location management functions (LMF(s)) and/or access and mobility management function(s) (AMF(S)) and/or user plane functions (UPF(s)) and/or session management function(s) (SMF(s)). Such core network functionality for LTE may include MME (mobility management entity)/SGW (serving gateway) functionality. Such core network functionality may include SON (self-organizing/optimizing network) functionality. These are merely example functions that may be supported by the network element(s) 190, and note that both 5G and LTE functions might be supported. The RAN node 170 is coupled via a connection 131 to the network element 190. The connection 131 may be implemented as, e.g., an NG interface for 5G, or an SI interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. Computer program code 173 may include SON and/or mobility robustness optimization (MRO) functionality 172.

The wireless network 100 may implement network virtualization, which is the process of combining hardware and software network resources and network functionality into a single, software-based administrative entity, or a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, non-transitory memory, transitory memory, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various example embodiments of the UE 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback devices having wireless communication capabilities, internet appliances including those permitting wireless internet access and browsing, tablets with wireless communication capabilities, head mounted displays such as those that implement virtual/augmented/mixed reality, as well as portable units or terminals that incorporate combinations of such functions. The UE 110 can also be a vehicle such as a car, or a UE mounted in a vehicle, an unmanned aerial vehicle (UAV) such as e.g. a drone, or a UE mounted in a UAV. The UE 110 may be terminal device, such as mobile phone, mobile device, sensor device etc., the terminal device being a device used by the user or not used by the user.

UE 110, RAN node 170, and/or network element(s) 190, (and associated memories, computer program code and modules) may be configured to implement (e.g. in part) the methods described herein, including reducing energy consumption of a base station cluster over a fixed time window. Thus, computer program code 123, module 140-1, module 140-2, and other elements/features illustrated in FIG. 5 of UE 110 may implement user equipment related aspects of the examples described herein. Similarly, computer program code 153, module 150-1, module 150-2, and other elements/features illustrated in FIG. 5 of RAN node 170 may implement base station/gNB/TRP related aspects of the examples described herein. Computer program code 173 and other elements/features illustrated in FIG. 5 of network element(s) 190 may be configured to implement network element related aspects of the examples described herein, such as functionality of a computing node.

Figures 6, 7:
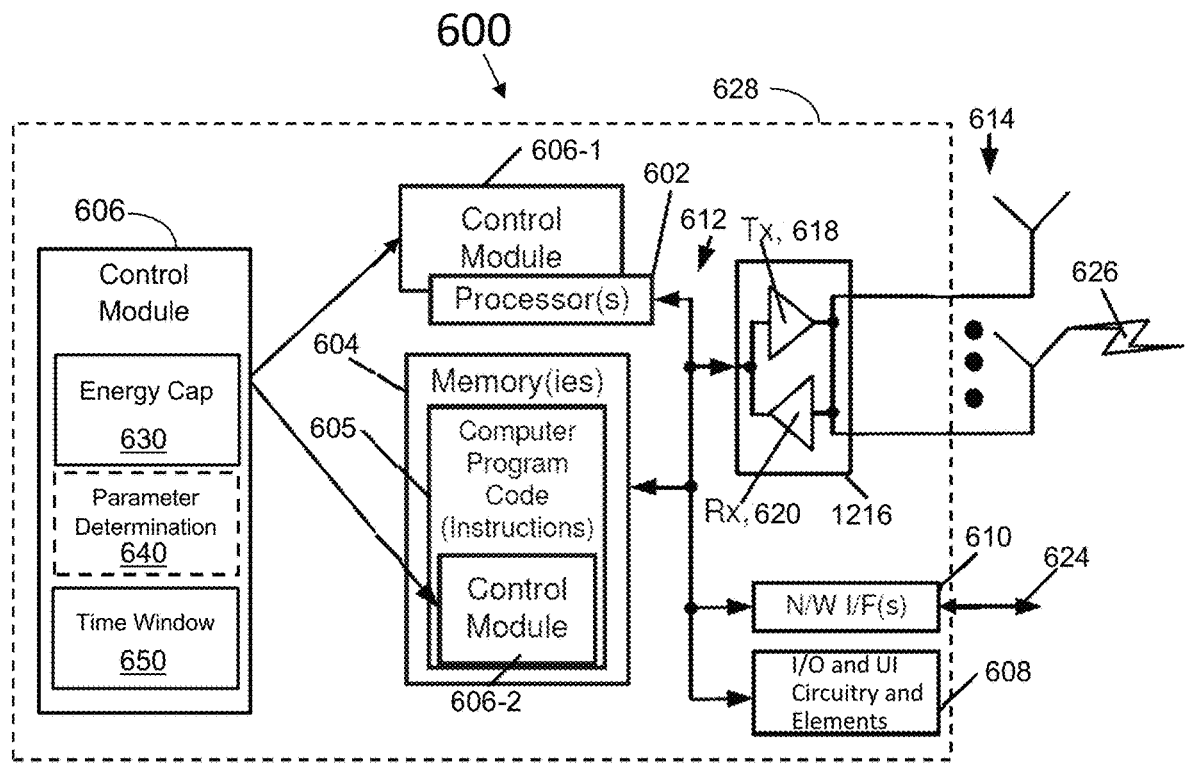
FIG. 6 illustrates an example apparatus configured to implement the examples described herein.
FIG. 7 illustrates an example implementation of non-volatile memory media used to store instructions that implement the examples described herein.

FIG. 6 is an example apparatus 600, which may be implemented in hardware, configured to implement the examples described herein. The apparatus 600 comprises at least one processor 602 (e.g. a field programmable gate array (FPGA) and/or central processing unit (CPU)), one or more memories 604 including computer program code 605, the computer program code 605 having instructions to carry out the methods described herein, wherein the at least one memory 604 and the computer program code 605 are configured to, with the at least one processor 602, cause the apparatus 600 to implement circuitry, a process, component, module, or function (implemented with control module 606) to implement the examples described herein, including reducing energy consumption of a base station cluster over a fixed time window. The memory 604 may be a non-transitory memory, a transitory memory, a volatile memory (e.g. random access memory (RAM)), or a non-volatile memory (e.g. read-only memory (ROM)).

The apparatus 600 includes a display and/or input/output (I/O) interface 608, which includes user interface (UI) circuitry and elements, that may be used to display aspects or a status of the methods described herein (e.g., as one of the methods is being performed or at a subsequent time), or to receive input from a user such as with using a keypad, camera, touchscreen, touch area, microphone, biometric recognition, one or more sensors, etc. The apparatus 600 includes one or more communication e.g. network (N/W) interfaces (I/F(s)) 610. The communication I/F(s) 610 may be wired and/or wireless and communicate over the Internet/other network(s) via any communication technique including via one or more links 624. The link(s) 624 may be the connection(s) 131 and/or 176 from FIG. 1. The connection(s) (or link(s)) 131 and/or 176 from FIG. 1 may also be implemented using transceiver(s) 616 and corresponding wireless link(s) 626. The communication I/F(s) 610 may comprise one or more transmitters or one or more receivers.

The transceiver 616 comprises one or more transmitters 618 and one or more receivers 620. The transceiver 616 and/or communication I/F(s) 610 may include components such as an amplifier, filter, frequency-converter, (de) modulator, and encoder/decoder circuitries and one or more antennas, such as antennas 614 used for communication over wireless link 626.

The control module 606 of the apparatus 600 comprises one of or both parts 606-1 and/or 606-2, which may be implemented in a number of ways. The control module 606 may be implemented in hardware as control module 606-1, such as being implemented as part of the one or more processors 602. The control module 606-1 may be implemented also as an integrated circuit or through other hardware such as a programmable gate array. In another example, the control module 606 may be implemented as control module 606-2, which is implemented as computer program code (having corresponding instructions) 605 and is executed by the one or more processors 602. For instance, the one or more memories 604 store instructions that, when executed by the one or more processors 602, cause the apparatus 600 to perform one or more of the operations as described herein. Furthermore, the one or more processors 602, the one or more memories 604, and example algorithms (e.g., as flowcharts and/or signaling diagrams), encoded as instructions, programs, or code, are means for causing performance of the operations described herein.

Energy cap 630 of the control module 606 may determine or implement an energy cap, optional parameter determination 640 may determine parameters $\{v\}_{k=1}^{K}$ (the weights) or p (the fairness level), and time window 650 may determine the herein described time window or define the time window during which the energy cap is determined or implemented.

The apparatus 600 to implement the functionality of control 606 may be UE 110, RAN node 170 (e.g. gNB), or network element(s) 190. Thus, processor 602 may correspond to processor(s) 120, processor(s) 152 and/or processor(s) 175, memory 604 may correspond to one or more memories 125, one or more memories 155 and/or one or more memories 171, computer program code 605 may correspond to computer program code 123, computer program code 153, and/or computer program code 173, control module 606 may correspond to module 140-1, module 140-2, module 150-1, and/or module 150-2, and communication I/F(s) 610 and/or transceiver 616 may correspond to transceiver 130, antenna(s) 128, transceiver 160, antenna(s) 158, N/W I/F(s) 161, and/or N/W I/F(s) 180.

Alternatively, apparatus 600 and its elements may not correspond to either of UE 110, RAN node 170, or network element(s) 190 and their respective elements, as apparatus 600 may be part of a self-organizing/optimizing network (SON) node or other node, such as a node in a cloud. Apparatus 600 may also correspond to an apparatus implemented with regulatory entity 210, computing node 220, or an apparatus used to control the cluster 230 of base stations 170.

The apparatus 600 may also be distributed throughout the network (e.g. 100) including within and between apparatus 600 and any network element (such as a network control element (NCE) 190 and/or the RAN node 170 and/or the UE 110).

Interface 612 enables data communication and signaling between the various items of apparatus 600, as shown in FIG. 6. For example, the interface 612 may be one or more buses such as address, data, or control buses, and may include any interconnection mechanism, such as a series of lines on a motherboard or integrated circuit, fiber optics or other optical communication equipment, and the like. Computer program code (e.g. instructions) 605, including control 606 may comprise object-oriented software configured to pass data or messages between objects within computer program code 605. The apparatus 600 need not comprise each of the features mentioned, or may comprise other features as well. The various components of apparatus 600 may at least partially reside in a common housing 628, or a subset of the various components of apparatus 600 may at least partially be located in different housings, which different housings may include housing 628.

FIG. 7 shows a schematic representation of non-volatile memory media 700a (e.g. computer/compact disc (CD) or digital versatile disc (DVD)) and 700b (e.g. universal serial bus (USB) memory stick) and 700c (e.g. cloud storage for downloading instructions and/or parameters 702) storing instructions and/or parameters 702 which when executed by a processor allows the processor to perform one or more of the steps of the methods described herein.

Figure 8:
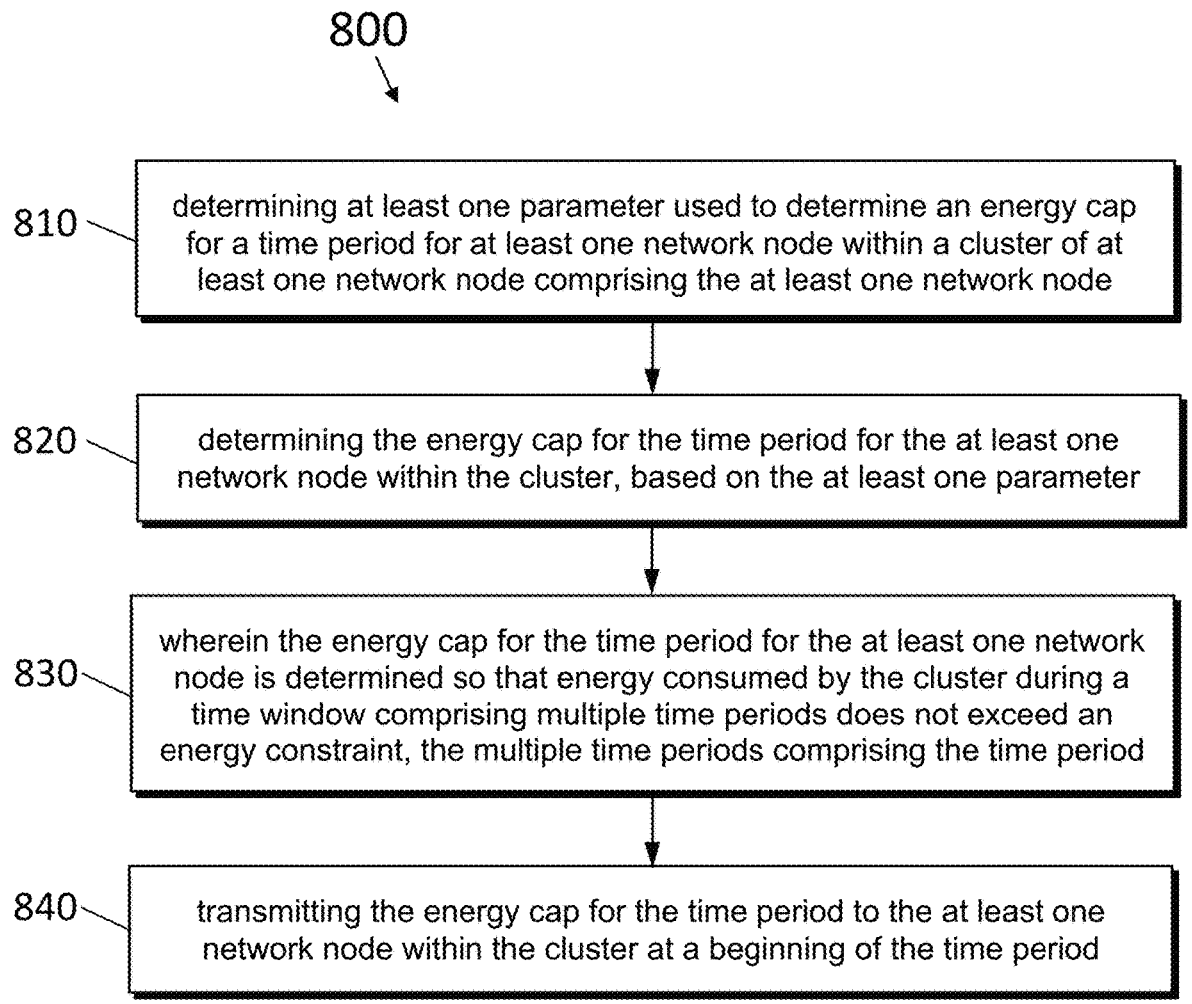
FIG. 8 illustrates an example method for reducing energy consumption of a base station over a predefined period of time.

FIG. 8 is an example method 800, based on the example embodiments described herein. At 810, the method includes determining at least one parameter used to determine an energy cap for a time period for at least one network node within a cluster of at least one network node comprising the at least one network node. At 820, the method includes determining the energy cap for the time period for the at least one network node within the cluster, based on the at least one parameter. At 830, the method includes wherein the energy cap for the time period for the at least one network node is determined so that energy consumed by the cluster during a time window comprising multiple time periods does not exceed an energy constraint, the multiple time periods comprising the time period. At 840, the method includes transmitting the energy cap for the time period to the at least one network node within the cluster at a beginning of the time period. Method 800 may be performed with computing node 220, network element(s) 190, or apparatus 600.

Figure 9:
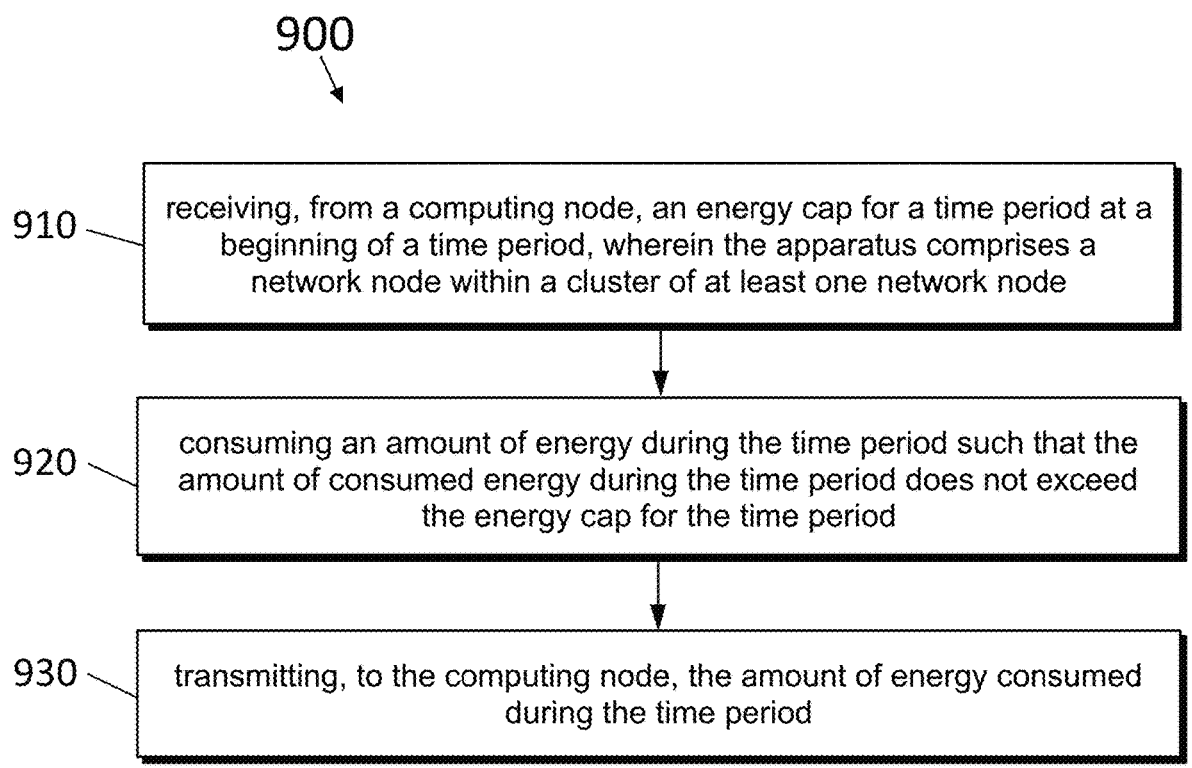
FIG. 9 illustrates another example method for reducing energy consumption of a base station over a predefined period of time.

FIG. 9 is an example method 900, based on the example embodiments described herein. At 910, the method includes receiving, from a computing node, an energy cap for a time period at a beginning of a time period, wherein the apparatus comprises a network node within a cluster of at least one network node. At 920, the method includes consuming an amount of energy during the time period such that the amount of consumed energy during the time period does not exceed the energy cap for the time period. At 930, the method includes transmitting, to the computing node, the amount of energy consumed during the time period. Method 900 may be performed with RAN node 170 or apparatus 600.

The following examples are provided and described herein.

Example 1. An apparatus including: at least one processor; and at least one memory storing instructions that, when executed by the at least one processor, cause the apparatus at least to: determine at least one parameter used to determine an energy cap for a time period for at least one network node within a cluster of at least one network node comprising the at least one network node; determine the energy cap for the time period for the at least one network node within the cluster, based on the at least one parameter; wherein the energy cap for the time period for the at least one network node is determined so that energy consumed by the cluster during a time window comprising multiple time periods does not exceed an energy constraint, the multiple time periods comprising the time period; and transmit the energy cap for the time period to the at least one network node within the cluster at a beginning of the time period.

Example 2. The apparatus of example 1, wherein the instructions, when executed by the at least one processor, cause the apparatus at least to: determine an energy cap for the cluster for the time period, based on the at least one parameter; and determine the energy cap for the time period for the at least one network node, based on the energy cap for the cluster for the time period.

Example 3. The apparatus of example 2, wherein the energy cap for the cluster for the time period comprises a sum of the energy cap for the time period for the at least one network node.

Example 4. The apparatus of any of examples 2 to 3, wherein the instructions, when executed by the at least one processor, cause the apparatus at least to: determine a remaining available energy budget for the time period by subtracting an actual energy consumption of the at least one network node during at least one pervious time period from the energy constraint; determine a value by applying a fairness level to a portion of the energy constraint, wherein the portion of the energy constraint is determined based on a number of at least one remaining time period, and wherein the at least one parameter comprises the fairness level; and determine the energy cap for the cluster for the time period as the value subtracted from the remaining available energy budget.

Example 5. The apparatus of example 4, wherein the instructions, when executed by the at least one processor, cause the apparatus at least to: determine the fairness level so that total energy consumed for a time period for the cluster is greater than the fairness level multiplied by the energy constraint divided by a number of at least one time period comprising the time period.

Example 6. The apparatus of example 5, wherein the instructions, when executed by the at least one processor, cause the apparatus at least to: determine the fairness level to be between zero and one.

Example 7. The apparatus of any of examples 4 to 6, wherein the instructions, when executed by the at least one processor, cause the apparatus at least to: determine a coefficient associated with the at least one network node, wherein the at least one parameter comprises the coefficient associated with the at least one network node; determine a sum corresponding to a sum of at least one weight for the at least one network node within the cluster, wherein the at least one parameter comprises the at least one weight for the at least one network node within the cluster; determine a value corresponding to the coefficient associated with the at least one network node divided by the sum; determine the energy cap for the time period for the at least one network node as the energy cap for the cluster for the time period scaled by the value.

Example 8. The apparatus of example 7, wherein the instructions, when executed by the at least one processor, cause the apparatus at least to: determine the coefficient associated with the at least one network node as an average energy previously consumed by the at least one network node for at least one previous time period during the time window during which the energy consumed by the cluster does not exceed the energy constraint.

Example 9. The apparatus of any of examples 4 to 8, wherein the instructions, when executed by the at least one processor, cause the apparatus at least to: receive, from the at least one network node, the actual energy consumption of the at least one network node during the at least one pervious time period.

Example 10. The apparatus of any of examples 1 to 9, wherein the instructions, when executed by the at least one processor, cause the apparatus at least to: receive an energy consumed by the at least one network node during the time period; and determine an energy cap for a next time period based on the energy consumed by the at least one network node during the time period.

Example 11. The apparatus of any of examples 1 to 10, wherein the instructions, when executed by the at least one processor, cause the apparatus at least to: determine the time window during which the energy consumed by the cluster does not exceed the energy constraint, the time window being based on the energy constraint; wherein the time period occurs within the time window.

Example 12. The apparatus of any of examples 1 to 11, wherein the instructions, when executed by the at least one processor, cause the apparatus at least to: determine a fairness level so that a consumption distribution of the cluster over time is fairly distributed based on a fairness metric.

Example 13. The apparatus of example 12, wherein the instructions, when executed by the at least one processor, cause the apparatus at least to: determine the fairness level as one minus the energy constraint divided by a historical energy demand of the cluster.

Example 14. The apparatus of any of examples 12 to 13, wherein the instructions, when executed by the at least one processor, cause the apparatus at least to: determine an effect of different values of the fairness level for a plurality of days for a plurality of time periods; wherein plurality of time periods comprise periods of time during which no energy control is applied; and determine the fairness level based on the effect of the different values of the fairness level for the plurality of days for the plurality of time periods.

Example 15. The apparatus of example 14, wherein the instructions, when executed by the at least one processor, cause the apparatus at least to: determine an effect of one value of the fairness level for a day based on an energy consumption for the plurality of time periods, the energy consumption during a time period being a smaller of an energy demand for the day combined with an unmet energy demand during the time period, and an energy cap for the cluster during the time period.

Example 16. The apparatus of example 15, wherein the instructions, when executed by the at least one processor, cause the apparatus at least to: update an energy budget used to determine the energy cap for the cluster during a next time period; and update the unmet energy for the next time period based on the energy consumption during the time period subtracted from the energy demand for the day combined with the unmet energy demand during the time period, and a dropping factor that describes a portion of energy waiting to be served being dropped at the next time period.

Example 17. The apparatus of any of examples 1 to 16, wherein the instructions, when executed by the at least one processor, cause the apparatus at least to: perform at least one action so that the energy consumed by the cluster during the time window does not exceed the energy constraint.

Example 18. The apparatus of example 17, wherein the at least one action comprises reducing at least one of: antenna power, a number of at least one subcarrier, a number of at least one frequency layer, a number of at least one physical resource block, or a number of at least one transmit path.

Example 19. The apparatus of any of examples 1 to 18, wherein the at least one parameter comprises a fairness level used to determine an energy cap for the cluster for the time period.

Example 20. The apparatus of any of examples 1 to 19, wherein the at least one parameter comprises a coefficient associated with the at least one network node.

Example 21. The apparatus of any of examples 7 to 20, wherein the at least one weight for the at least one network node within the cluster comprises the coefficient.

Example 22. An apparatus including: at least one processor; and at least one memory storing instructions that, when executed by the at least one processor, cause the apparatus at least to: receive, from a computing node, an energy cap for a time period at a beginning of a time period, wherein the apparatus comprises a network node within a cluster of at least one network node; consume an amount of energy during the time period such that the amount of consumed energy during the time period does not exceed the energy cap for the time period; and transmit, to the computing node, the amount of energy consumed during the time period.

Example 23. The apparatus of example 22, wherein the instructions, when executed by the at least one processor, cause the apparatus at least to: receive, from the computing node, an energy cap for a next time period at a beginning of the next time period; wherein the transmitted amount of energy consumed during the time period is configured to be used with the computing node to determine the energy cap for the next time period; and consume an amount of energy during the next time period such that the amount of consumed energy during the next time period does not exceed the energy cap for the next time period.

Example 24. The apparatus of any of examples 22 to 23, wherein the transmitted amount of energy consumed during the time period is configured to be used with the computing node to determine a cluster level energy cap shared by the apparatus with at least one other network node within the cluster.

Example 25. The apparatus of any of examples 22 to 24, wherein the instructions, when executed by the at least one processor, cause the apparatus at least to: perform at least one action so that the amount of energy consumed during the time period does not exceed the energy cap.

Example 26. The apparatus of example 25, wherein the at least one action comprises reducing at least one of: antenna power, a number of at least one subcarrier, a number of at least one frequency layer, a number of at least one physical resource block, or a number of at least one transmit path.

Example 27. The apparatus of any of examples 22 to 26, wherein the energy cap for the time period is determined so that energy consumed by the cluster during a time window comprising multiple time periods does not exceed an energy constraint, the multiple time periods comprising the time period.

Example 28. A method including: determining at least one parameter used to determine an energy cap for a time period for at least one network node within a cluster of at least one network node comprising the at least one network node; determining the energy cap for the time period for the at least one network node within the cluster, based on the at least one parameter; wherein the energy cap for the time period for the at least one network node is determined so that energy consumed by the cluster during a time window comprising multiple time periods does not exceed an energy constraint, the multiple time periods comprising the time period; and transmitting the energy cap for the time period to the at least one network node within the cluster at a beginning of the time period.

Example 29. A method including: receiving, from a computing node, an energy cap for a time period at a beginning of a time period, wherein the apparatus comprises a network node within a cluster of at least one network node; consuming an amount of energy during the time period such that the amount of consumed energy during the time period does not exceed the energy cap for the time period; and transmitting, to the computing node, the amount of energy consumed during the time period.

Example 30. An apparatus including: means for determining at least one parameter used to determine an energy cap for a time period for at least one network node within a cluster of at least one network node comprising the at least one network node; means for determining the energy cap for the time period for the at least one network node within the cluster, based on the at least one parameter; wherein the energy cap for the time period for the at least one network node is determined so that energy consumed by the cluster during a time window comprising multiple time periods does not exceed an energy constraint, the multiple time periods comprising the time period; and means for transmitting the energy cap for the time period to the at least one network node within the cluster at a beginning of the time period.

Example 31. An apparatus including: means for receiving, from a computing node, an energy cap for a time period at a beginning of a time period, wherein the apparatus comprises a network node within a cluster of at least one network node; means for consuming an amount of energy during the time period such that the amount of consumed energy during the time period does not exceed the energy cap for the time period; and means for transmitting, to the computing node, the amount of energy consumed during the time period.

Example 32. A non-transitory program storage device readable by a machine, tangibly embodying a program of instructions executable by the machine for performing operations, the operations including: determining at least one parameter used to determine an energy cap for a time period for at least one network node within a cluster of at least one network node comprising the at least one network node; determining the energy cap for the time period for the at least one network node within the cluster, based on the at least one parameter; wherein the energy cap for the time period for the at least one network node is determined so that energy consumed by the cluster during a time window comprising multiple time periods does not exceed an energy constraint, the multiple time periods comprising the time period; and transmitting the energy cap for the time period to the at least one network node within the cluster at a beginning of the time period.

Example 33. A non-transitory program storage device readable by a machine, tangibly embodying a program of instructions executable by the machine for performing operations, the operations including: receiving, from a computing node, an energy cap for a time period at a beginning of a time period, wherein the apparatus comprises a network node within a cluster of at least one network node; consuming an amount of energy during the time period such that the amount of consumed energy during the time period does not exceed the energy cap for the time period; and transmitting, to the computing node, the amount of energy consumed during the time period.

References to a 'computer', 'processor', etc. should be understood to encompass not only computers having different architectures such as single/multi-processor architectures and sequential or parallel architectures but also specialized circuits such as field-programmable gate arrays (FPGAs), application specific integrated circuits (ASICs), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The memories as described herein may be implemented using any suitable data storage technology, such as semiconductor based memory devices, flash memory, magnetic memory devices and systems, optical memory devices and systems, non-transitory memory, transitory memory, fixed memory and removable memory. The memories may comprise a database for storing data.

As used herein, the term 'circuitry' may refer to the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memories that work together to cause an apparatus to perform various functions, and (c) circuits, such as a microprocessor(s) or a portion of a microprocessor(s), that require software or firmware for operation, even if the software or firmware is not physically present. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

It should be understood that the foregoing description is only illustrative. Various alternatives and modifications may be devised by those skilled in the art. For example, features recited in the various dependent claims could be combined with each other in any suitable combination(s). In addition, features from different example embodiments described above could be selectively combined into a new example embodiment. Accordingly, this description is intended to embrace all such alternatives, modifications and variances which fall within the scope of the appended claims.

The invention claimed is:

1. An apparatus comprising:
   at least one processor; and
   at least one memory storing instructions that, when executed by the at least one processor, cause the apparatus at least to:
   determine at least one parameter used to determine an energy cap for a time period for at least one network node within a cluster of at least one network node comprising the at least one network node;
   determine an energy cap for the cluster for the time period, based on the at least one parameter;
   determine the energy cap for the time period for the at least one network node within the cluster, based on the energy cap for the cluster for the time period;
   wherein the energy cap for the time period for the at least one network node is determined so that energy consumed by the cluster during a time window comprising multiple time periods does not exceed an energy constraint, the multiple time periods comprising the time period;
   determine a remaining available energy budget for the time period by subtracting an actual energy consumption of the at least one network node during at least one previous time period from the energy constraint;
   determine a value by applying a fairness level to a portion of the energy constraint, wherein the portion of the energy constraint is determined based on a number of at least one remaining time period, and wherein the at least one parameter comprises the fairness level; and
   determine the energy cap for the cluster for the time period as the value subtracted from the remaining available energy budget; and
   transmit the energy cap for the time period to the at least one network node within the cluster at a beginning of the time period.

2. The apparatus of claim 1, wherein the energy cap for the cluster for the time period comprises a sum of the energy cap for the time period for the at least one network node.

3. The apparatus of claim 1, wherein the instructions, when executed by the at least one processor, cause the apparatus at least to:
   determine the fairness level so that total energy consumed for a time period for the cluster is greater than the fairness level multiplied by the energy constraint divided by a number of at least one time period comprising the time period.

4. The apparatus of claim 1, wherein the instructions, when executed by the at least one processor, cause the apparatus at least to:
   determine a coefficient associated with the at least one network node, wherein the at least one parameter comprises the coefficient associated with the at least one network node;
   determine a sum corresponding to a sum of at least one weight for the at least one network node within the cluster, wherein the at least one parameter comprises the at least one weight for the at least one network node within the cluster;
   determine a value corresponding to the coefficient associated with the at least one network node divided by the sum;
   determine the energy cap for the time period for the at least one network node as the energy cap for the cluster for the time period scaled by the value.

5. The apparatus of claim 4, wherein the instructions, when executed by the at least one processor, cause the apparatus at least to:
   determine the coefficient associated with the at least one network node as an average energy previously consumed by the at least one network node for at least one previous time period during the time window during which the energy consumed by the cluster does not exceed the energy constraint.

6. The apparatus of claim 4, wherein the at least one weight for the at least one network node within the cluster comprises the coefficient.

7. The apparatus of claim 1, wherein the instructions, when executed by the at least one processor, cause the apparatus at least to:
   receive an energy consumed by the at least one network node during the time period; and
   determine an energy cap for a next time period based on the energy consumed by the at least one network node during the time period.

8. The apparatus of claim 1, wherein the instructions, when executed by the at least one processor, cause the apparatus at least to:
   determine the time window during which the energy consumed by the cluster does not exceed the energy constraint, the time window being based on the energy constraint;
   wherein the time period occurs within the time window.

9. The apparatus of claim 1, wherein the instructions, when executed by the at least one processor, cause the apparatus at least to:
   determine a fairness level so that a consumption distribution of the cluster over time is fairly distributed based on a fairness metric; and
   determine the fairness level as one minus the energy constraint divided by a historical energy demand of the cluster.

10. The apparatus of claim 9, wherein the instructions, when executed by the at least one processor, cause the apparatus at least to:

determine an effect of different values of the fairness level for a plurality of days for a plurality of time periods;

wherein plurality of time periods comprise periods of time during which no energy control is applied; and determine the fairness level based on the effect of the different values of the fairness level for the plurality of days for the plurality of time periods.

11. The apparatus of claim 1, wherein the at least one parameter comprises a fairness level used to determine an energy cap for the cluster for the time period, and wherein the at least one parameter comprises a coefficient associated with the at least one network node.

* * * * *